United States Patent [19]

Takamura et al.

[11] 4,298,894
[45] Nov. 3, 1981

[54] IMAGE PICK-UP TUBE

[75] Inventors: Yoshio Takamura; Soichiro Abe; Noboru Nakamura; Hiroyuki Suzuki, all of Yokohama, Japan

[73] Assignee: Tokyo Shibaura Denki Kabushiki Kaisha, Kawasaki, Japan

[21] Appl. No.: 119,847

[22] Filed: Feb. 8, 1980

[30] Foreign Application Priority Data

Feb. 14, 1979 [JP] Japan .................................. 54-15672

[51] Int. Cl.³ ............................................ H04N 5/30
[52] U.S. Cl. ..................................... 358/229; 358/41; 315/8; 313/479; 313/440
[58] Field of Search ...................... 358/229, 245, 41; 315/8; 313/479, 440

[56] References Cited

U.S. PATENT DOCUMENTS 4,218,712  8/1980  Clymer et al. ..................... 358/229

Primary Examiner—Richard Murray
Attorney, Agent, or Firm—Cushman, Darby & Cushman

[57] ABSTRACT

An image pick-up tube assembly, including an image pick-up tube having a target provided in the front portion thereof, a coil assembly surrounding the image pick-up tube, a cylindrical shield case housing the image pick-up tube and the coil assembly, and front and rear shield caps covering the front and rear openings of the shield case. The front shield cap is mounted to the shield case such that both horizontal and vertical contact planes are formed therebetween to significantly reduce the influence of the earth's magnetism on the assembly so that a three tube type television camera employing three such assemblies is effected much less by direction dependent color deviation.

8 Claims, 11 Drawing Figures

FIG. 1
PRIOR ART
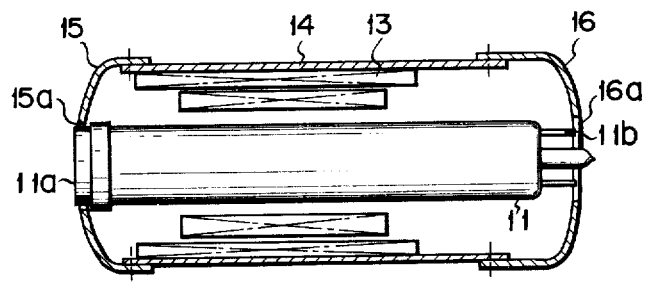
FIG. 2A
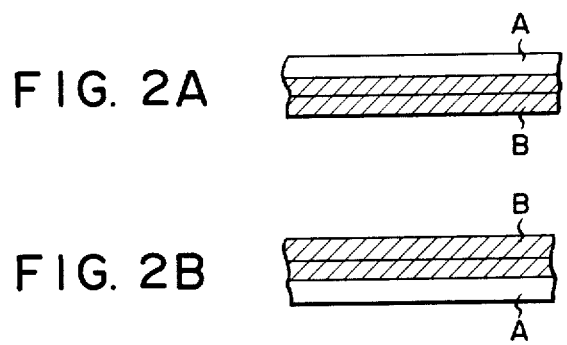
FIG. 2B
FIG. 3
PRIOR ART
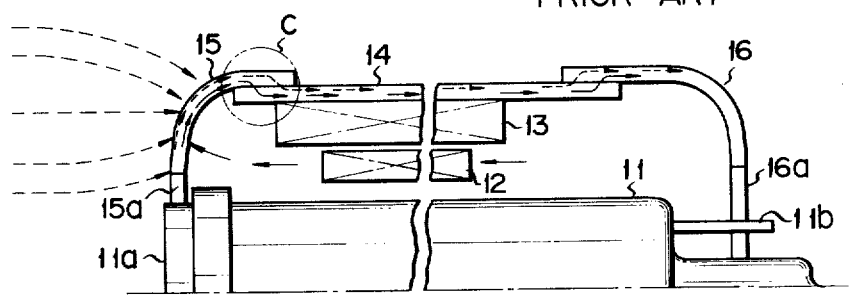

IMAGE PICK-UP TUBE

BACKGROUND OF THE INVENTION

This invention relates to an image pick-up tube, particularly, to apparatus, e.g., color television camera, in which the influence of the earth's magnetism is suppressed.

As is known well, it is impossible to neglect the influence of the earth's magnetism when attempting to improve the properties of a television camera. The influence of the earth's magnetism is particularly significant in a three tube color television camera. Specifically, the three tubes for picking up electric signals for red (R), green (G), and blue (B) light are not arranged in the same direction and, thus, differ from each other in the degree to which they are influenced by the earth's magnetism, rendering it difficult to perform the registration adjustment of the television camera.

In order to eliminate the influence of the earth's magnetism, it is customary to cover an image pick-up tube with a shield case as shown in FIG. 1. An image pick-up tube 11 is provided with a target 11a and an external connecting terminal 11b at the front and rear ends, respectively. A deflection coil 12 and a focusing coil 13 are provided around image pick-up tube 11. Further, image pick-up tube 11, deflection coil 12 and focusing coil 13 are housed in a cylindrical shield case 14. Shield caps 15 and 16 are mounted to the ends of shield case 14. The central portions of caps 15 and 16 define apertures 15a and 16a, respectively, so that target 11a and external connecting terminal 11b are exposed to the outside.

In a color television camera comprising three tubes, each constructed as shown in FIG. 1, the registration adjustment is performed as follows. First, an image pattern for registration adjustment is projected on a screen of a picture tube by, for example, allowing the television camera to face to the west with the output patterns of the red and green color image pick-up tubes made positive and negative images, respectively. Under this condition, both output patterns are made to coincide. Then, the television camera is allowed to face to the north, east and south successively so as to examine the degree of coincidence between the output image patterns of the red and green color image pick-up tubes.

The registration adjustment described above permits cincidence of patterns where the television camera is directed to the east because the influence of the earth's magnetism is substantially the same in the east-west direction. But, the patterns deviate from each other when the television camera faces to the north or south. FIG. 2A shows the deviation between a negative pattern A formed by the red color image pick-up tube and a positive pattern B formed by the green color image pick-up tube, where the television camera faces to the north. FIG. 2B covers the case where the television camera faces to the south. The deviation is caused by the relative displacement of the two output patterns in both rotary and linear directions. Therefore, the degree of deviation is greater in the peripheral portion of the screen, though the deviation in the central portion of the screen is not negligible.

For recently developed television cameras, the scanning lines are smaller in width to improve the picture image resolution. This leads to a more demanding registration requirement.

FIGS. 3 and 4 illustrate the cause of the pattern deviation discussed above. As shown in FIG. 3, the magnetic flux, denoted by arrows of solid lines, generated mainly by focusing coil 13 runs through shield case 14 and shield caps 15 and 16. If the television camera faces to the north, the magnetic flux of the earth's magnetism is thought to run also through shield case 14 and shield caps 15 and 16 as shown by arrows with broken lines. FIG. 4 illustrates a magnification of portion C of FIG. 3. It is seen that both shield case 14 and shield cap 15 have rough surfaces and, thus, fail to make contact over the entire overlapping area. Strictly speaking, shield case 14 and shield cap 15 make point-to-point contact. In other words, the magnetic path in portion D is so narrow that magnetic saturation is thought to occur in portion D. Under this condition, the portion magnetically saturated is expanded or shrunk depending on the direction of the earth's magnetism, so that the shielding effect of shield case 14 and shield caps 15 and 16 varies widely depending on the direction of the television camera. The variation of the shielding effect not only leads to variation in the degree of influence of the earth's magnetism around target 11a but also influences the distribution of the focusing magnetic field around target 11a.

To be brief, the pattern deviation is influenced by not only the earth's magnetism but also the variation in the distribution of the focusing magnetic field defining the electron beam passageway. The variation of the focusing magnetic field distribution is very small in general, but generates marked deviations in the image pattern. Specifically, the distance of the electron beam passageway from the axis of the image pick-up tube is the greatest around target 11a. In addition, the running speed of the electron beam is close to zero around target 11a because of the influence of the deceleration electric field. It follows that the directivity is so weak around target 11a that even a slight variation of the magnetic field gives marked influences to the electron beam, leading to the occurrence of pattern deviation. The variation of the focusing magnetic field is a serious defect in a television camera, particularly, in a broadcasting television camera wherein high precision is a necessity.

SUMMARY OF THE INVENTION

An object of this invention is to provide an image pick-up tube capable of significantly suppressing the influence of the earth's magnetism and providing a color television camera of the three tube type which exhibits a marked improvement in suppressing the deviation of output signals from the image pick-up tubes, namely, color deviation.

According to this invention, there is provided an image pick-up tube assembly comprising an image pick-up tube having a target provided in the front portion thereof, a coil assembly surrounding the image pick-up tube, a cylindrical shield case housing the image pick-up tube and the coil assembly, and a shield cap serving to cover the front opening of the shield case and provided with an aperture corresponding in location to the target, the shield cap being mounted to the shield case such that both horizontal and vertical contact planes are formed therebetween.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which:

FIG. 1 is a cross sectional view showing an example of the prior art image pick-up tube assembly;

FIGS. 2A and 2B schematically illustrate the color deviation inherent in a three tube type color television camera using the image pick-up tube assembly of FIG. 1;

FIG. 3 shows the distribution of magnetic flux in the apparatus of FIG. 1;

DETAILED DESCRIPTION OF THE PREFERRED EMBODIMENT

Figure 4:
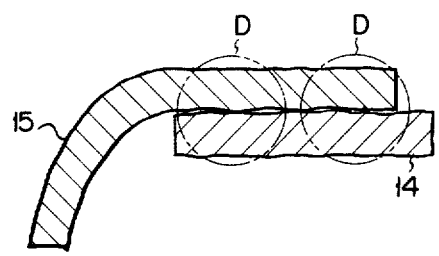
FIG. 4 illustrates in a magnified state one portion of the apparatus shown in FIG. 1.
Figure 5:
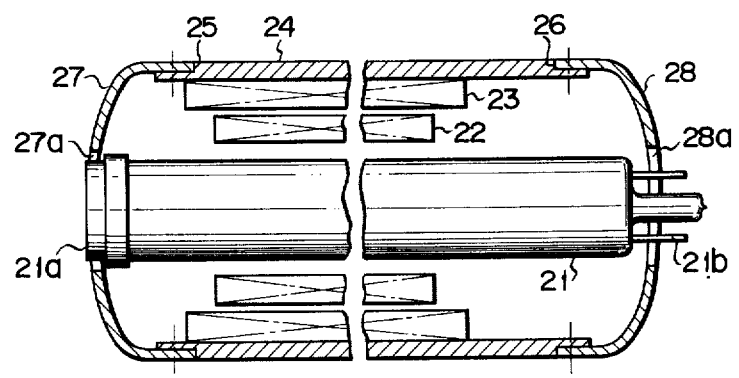
FIG. 5 is a cross sectional view showing an image pick-up tube apparatus according to one embodiment of this invention.

FIG. 5 shows an image pick-up tube assembly according to one embodiment of this invention. It is seen that an image pick-up tube 21 is provided with a target 21a and an external connecting terminal 21b at the front and rear ends, respectively. A coil assembly consisting of a deflection coil 22 and a focusing coil 23 is mounted of around image pick-up tube 21. Further, image pick-up tube 21, deflection coil 22 and focusing coil 23 are housed in a cylindrical shield case 24 formed of a high permeability material such as Mumetal or Parmalloy (trade name). Coupling means such as circular steps 25 and 26 are formed on both ends of shield case 24 along the outer circumference thereof for engagement with shielding means such as cup-shaped shield caps 27 and 28 formed of the same material as that of shield case 24. The circular steps 25 and 26 have a depth substantially equal to the thickness of the shield caps 27 and 28. Apertures 27a and 28a are formed in the central portions of shield caps 27 and 28 so as to expose target 21a and external connecting terminal 21b to the outside. Naturally, shield caps 27 and 28 are fixed to shield case 24 by means of, for example, screws (not shown) so that shield case 24 and shield caps 27 and 28 collectively form a magnetic path.

It is important to note that, in the embodiment illustrated in FIG. 5, shield case 24 is provided with the circular steps 25 and 26 at the end portions. Further, the end portions of shield caps 27 and 28 are received by steps 25 and 26 of shield case 24. It follows that shield caps 27 and 28 are mounted to shield case 24 such that both horizontal and vertical contact planes are formed therebetween in contrast to the prior art in which a horizontal contact plane alone is formed between the shield cap and the shield case. Naturally, the construction illustrated in FIG. 5 brings about a greater contact area between caps 27 and 28 and case 24 than that for the prior art. In addition, the construction illustrated in FIG. 5 is advantageous in that magnetic flux runs smoothly through the vertical contact plane so that the magnetic resistance is reduced. As a result of the decreased magnetic resistance, most of the magnetic flux generated by the earth's magnetism runs through shield caps 27 and 28 and shield case 24. In other words, leakage of the magnetic flux into the interior of the assembly is very small, so that difficulties caused by leaking magnetic flux, such as distortion of the magnetic flux generated by focusing coil 23 and deflection at the electron beam around target 21a, are reduced. In a color television camera of the three tube type formed with three assemblies each constructed as shown in FIG. 5, it has been found that the influence of the earth's magnetism is minimal, so that the output patterns of the R-, G-, B- image pick-up tubes deviate minimally from each other, independent of the direction the television camera faces.

In order to measure the pattern deviation caused by the earth's magnetism, two color television cameras were prepared, one using three conventional image pick-up tubes as shown in FIG. 1 and the other using three tubes as shown in FIG. 5. In the conventional apparatus, shield case 14 was 1 mm thick and shield caps 15 and 16 were 0.8 mm thick. Each image pick-up tube according to the present invention had a 2 mm thick shield case 24, 1 mm deep steps 25 and 26 and 0.8 mm thick shield caps 27 and 28.

To measure the pattern deviation, an image pattern for the registration adjustment was projected on a screen of a picture tube first with the television camera facing the west and the output images of the red and green color image pick-up tubes made positive and negative, respectively. The image pattern for the registration adjustment was long and narrow having a width equal to 0.1% of the vertical distance of an ordinary pattern. The positive and negative images were made to coincide. Then, the television camera was directed to the north, east and south, successively, so as to measure the deviation between the two patterns. The deviation was measured at the center, right end and left end of the pattern. The output pattern deviation between the blue and green color image pick-up tubes was also measured similarly. Tables 1 and 2, showing the results of the experiments described above covers the red-green and blue-green cases, respectively. The amount of deviation shown in the tables represents the ratio of the width of deviation to the width of the original pattern. Further, the symbols "+" and "—" represents the directions of deviation.

TABLE 1

| Type of Apparatus | Measuring Point | Camera Direction | | | |
|---|---|---|---|---|---|
| | | West | East | South | North |
| FIG. 1 (Prior Art) | Center | 0 | 0 | +1.0 | −1.5 |
| | Right End | 0 | 0 | +1.0 | −1.0 |
| | Left End | 0 | 0 | +0.5 | −0.5 |
| FIG. 5 (This Invention) | Center | 0 | 0 | +0.25 | −0.5 |
| | Right End | 0 | 0 | +0.25 | −0.5 |
| | Left End | 0 | 0 | −0.25 | +0.5 |

TABLE 2

| Type of Apparatus | Measuring Point | Camera Direction | | | |
|---|---|---|---|---|---|
| | | West | East | South | North |
| FIG. 1 (Prior Art) | Center | 0 | −1.0 | −1.5 | +1.5 |
| | Right End | 0 | −0.5 | −1.0 | +0.5 |
| | Left End | 0 | −0.5 | −1.5 | +1.0 |
| FIG. 5 (This Invention) | Center | 0 | −0.5 | −1.0 | +1.0 |
| | Right End | 0 | −0.5 | −1.0 | 0 |
| | Left End | 0 | −0.5 | −1.0 | +1.0 |

Tables 1 and 2 clearly show that the image pick-up tubes of this invention markedly decrease the pattern deviation, compared with the conventional apparatus.

Figure 6:
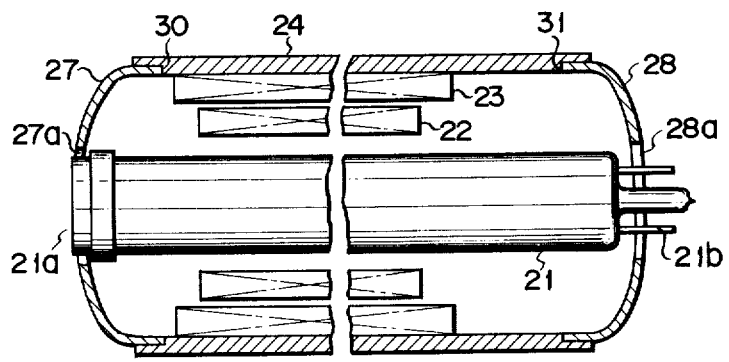
FIGS. 6 to 10 are cross sectional views each showing an image pick-up tube apparatus according to another embodiment of this invention.
Figure 7:
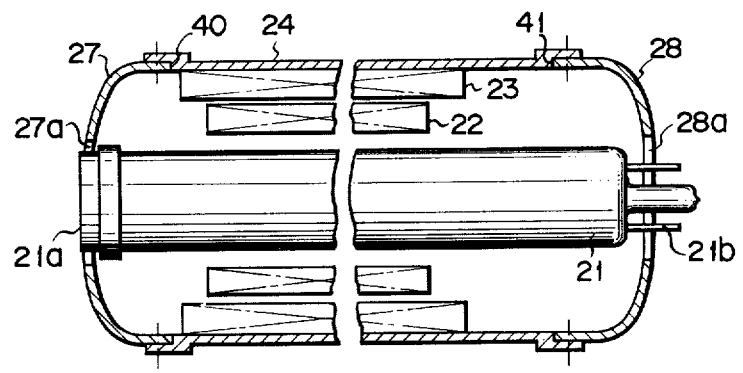
Figure 8:
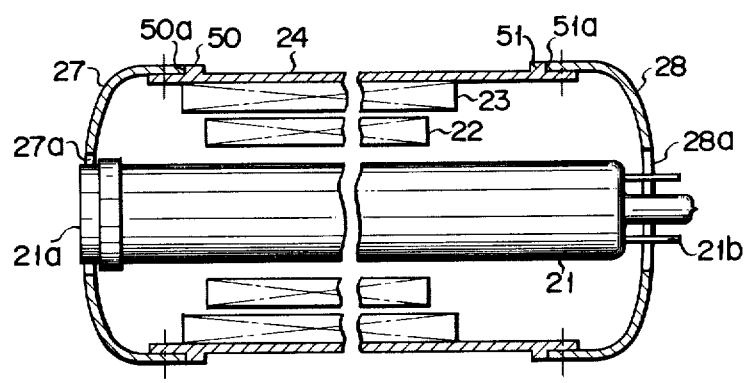
Figure 9:
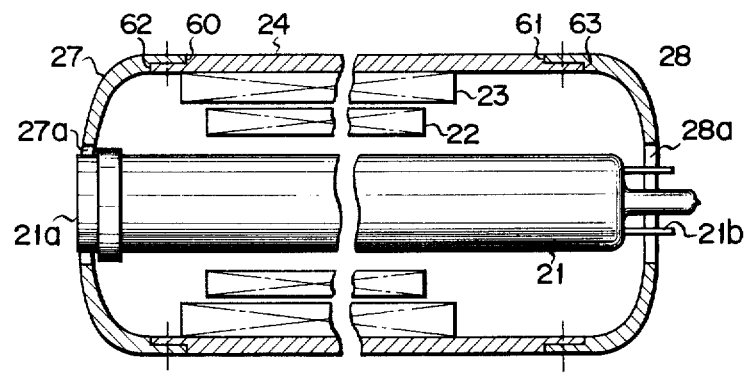
Figure 10:
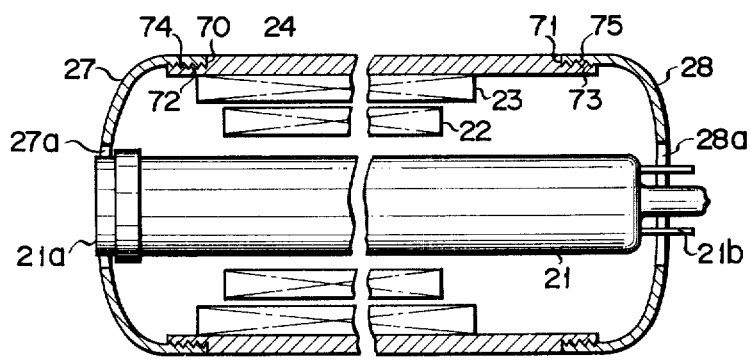

FIGS. 6 to 10 show additional embodiments of this invention. In the embodiment of FIG. 6, coupling means such as circular steps 30 and 31 of a depth substantially equal to the thickness of shield caps 27 and 28 are formed at the end portions of shield case 24 along the inner circumference thereof. Steps 30 and 31 serve to receive the end portions of shield caps 27 and 28 so as to mount the shield caps to the shield case. In FIG. 7, the wall of shield case 24 is made thicker at the end portions than in the central portion to form coupling means. In this embodiment, circular steps 40 and 41 of a depth substantially equal to the thickness of shield caps 27 and 28 are formed at the thick end portions of the shield case along the inner circumference thereof for engagement with the shield caps. In the embodiment of FIG. 8, coupling means such as circular projections 50 and 51 of a height substantially equal to the thickness of shield caps 27 and 28 are formed along the outer circumference of shield case 24 slightly apart from the ends of the shield case. Shield caps 27 and 28 are fitted to circular steps 50a and 51a formed by the presence of the projections 50 and 51 so as to mount the shield caps to the shield case. In FIG. 9, coupling means such as circular steps 60 and 61 are formed on the outer end portions of shield case 24 and other circular steps 62 and 63, also a part of the coupling means, are formed on the inner end portions of shield caps 27 and 28. The shield case and shield caps are engaged with each other at the stepped portions so as to mount the shield caps to the shield case. The embodiment of FIG. 10 is substantially similar to that of FIG. 5 except that the horizontal contact planes of the coupling means between shield case 24 and shield caps 27 and 28 are provided with threaded grooves in the embodiment of FIG. 10. Specifically, the shield case is provided with threaded grooves 72 and 73 for threaded engagement with threaded grooves 74 and 75 formed in shield caps 27 and 28 so as to mount the shield caps to the shield case.

The image pick-up tubes shown in each of FIGS. 6 to 10 was found to be effectively equivalent to the apparatus shown in FIG. 5. Particularly advantageous is the embodiment illustrated in FIG. 10 wherein shield caps 27 and 28 threadedly engage the end portions of shield case 24, since additional means need not be used for mounting the shield caps to the shield case. In addition, the contact area between the shield caps and the shield case is significantly increased, leading to a decreased magnetic resistance.

In the embodiments described above, circular steps are formed at both end portions of shield case 24. However, a satisfactory effect can be produced even if such a circular step is formed only on the end of case 24 near target 21a. Further, the depth of the circular step need not be equal to the thickness of the shield cap.

As described above in detail, this invention provides an image pick-up tube assembly in which the influence of the earth's magnetism is significantly suppressed. These assemblies can be combined in a color television camera of the three tube type to significantly reduce color deviation.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An image pick-up tube assembly suitable for use in a color television camera, comprising:
    an image pick-up tube having a target provided in the front portion thereof;
    a coil assembly surrounding said image pick-up tube;
    a cylindrical shield case having front and rear openings therein housing said image pick-up tube and said coil assembly; and
    front and rear shielding means for covering the front and rear openings of said shield case, said front shielding means including means for defining an aperture corresponding in location to said target, said front shielding means and said shield case including coupling means formed by a step portion of said cylindrical shield case adapted to interlock with said front shielding means forming a contact therebetween in both horizontal and vertical contact planes.

2. Apparatus as in claim 1, wherein said step portion of said cylindrical shield case is formed as a circular step disposed at the front end portion of said shield case along the outer circumference thereof for engagement with said front shielding means.

3. Apparatus as in claim 1, wherein said step portion of said cylindrical shield case is formed as a circular step disposed at the front end portion of said shield case along the inner circumference thereof for engagement with said front shielding means.

4. Apparatus as in claim 3, wherein the outer circumference of said coupling means extends further radially than the other circumference of the remaining portion of said shield case.

5. Apparatus as in claim 1, wherein said coupling means comprises a circular projection disposed at the front end portion of said shield case along the outer circumference thereof, forming a circular step for engagement with said front shielding means.

6. Apparatus as in claim 1, wherein said coupling means comprises circular steps disposed on both said shield case and said front shielding means for mutual engagement.

7. Apparatus as in claim 1, wherein the portions of said coupling means forming said horizontal contact plane are provided with threaded means for threadedly engaging said shielding means with said shield case.

8. Apparatus as in claims 1, 2, 3, 4, 5, 6 or 7 wherein at least one of said rear shielding means and said shield case includes coupling means having both horizontal and vertical contact planes.

* * * * *